Nov. 18, 1947.  D. H. DUFFY  2,431,029
MACHINE FOR ICING CAKE, OR THE LIKE
Filed March 29, 1945  3 Sheets-Sheet 1
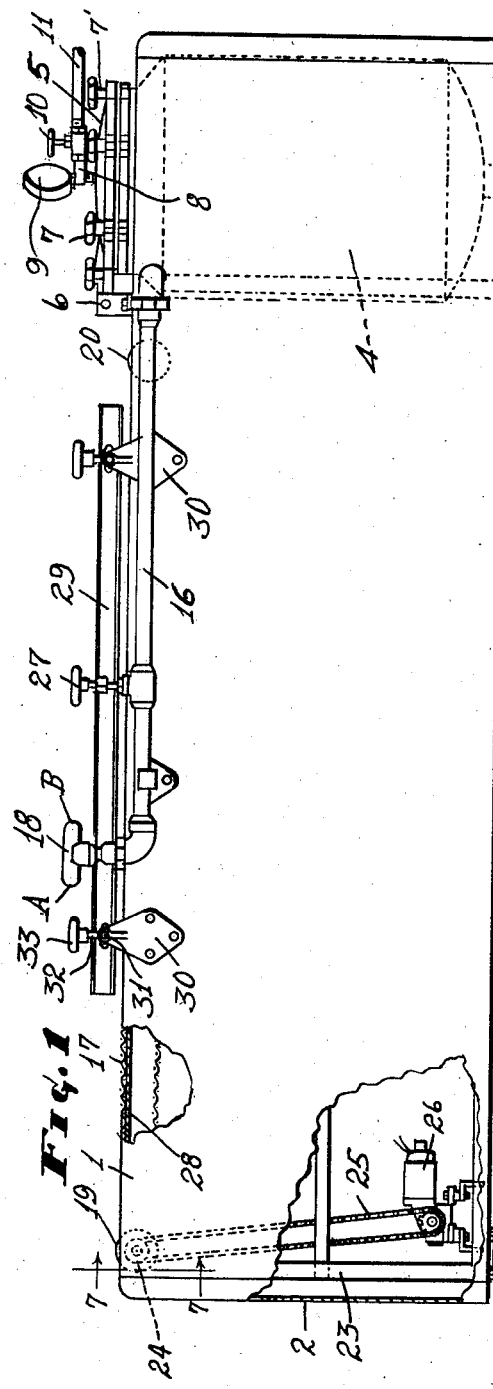
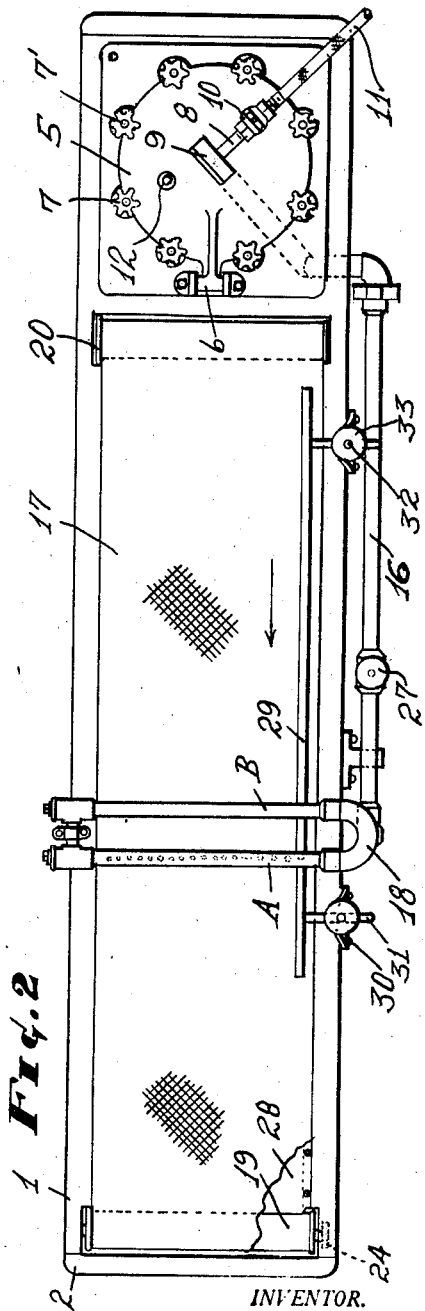
INVENTOR.
D. H. DUFFY

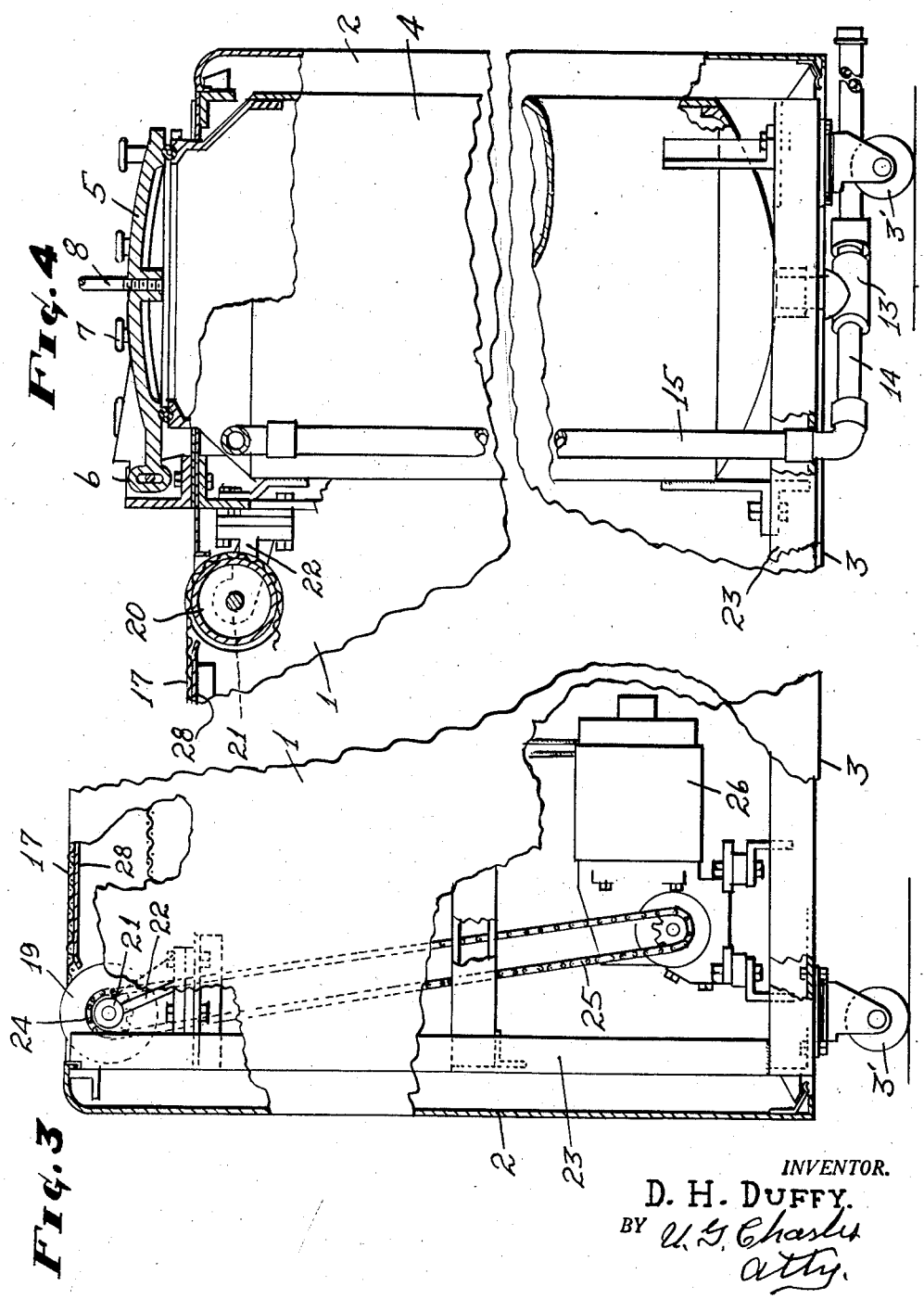

Nov. 18, 1947.        D. H. DUFFY        2,431,029
MACHINE FOR ICING CAKE, OR THE LIKE
Filed March 29, 1945        3 Sheets-Sheet 3
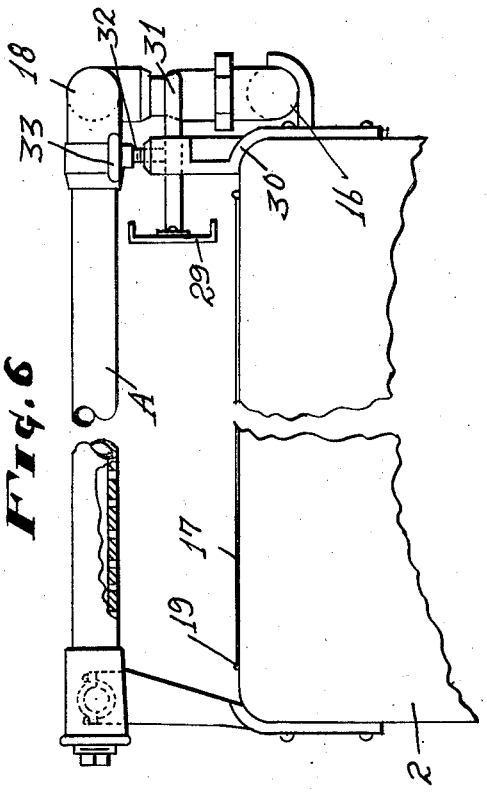
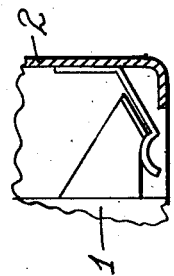
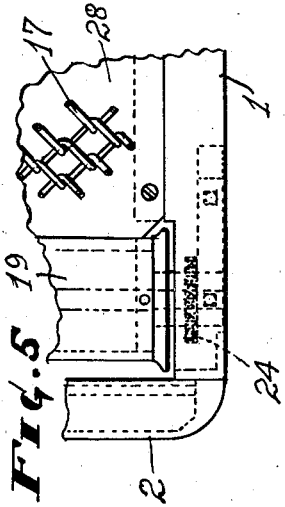
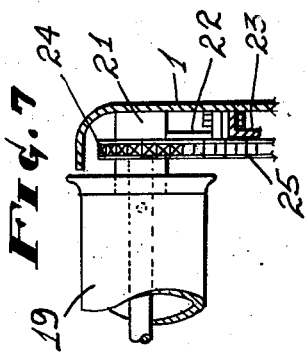
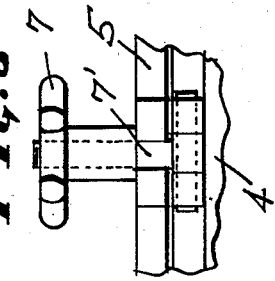
INVENTOR.
D. H. DUFFY Patented Nov. 18, 1947

2,431,029

UNITED STATES PATENT OFFICE 2,431,029

MACHINE FOR ICING CAKE OR THE LIKE

David H. Duffy, Wichita, Kans.

Application March 29, 1945, Serial No. 585,413

2 Claims. (Cl. 91—3)

This invention relates to a machine for icing cake, or the like, and has for its principal object an efficient means for rapid continuous application of icing to cake without loss or extravagance in the application of the icing.

A further object of this invention is to construct a machine that is continuous in its conveying and dispensing icing to cake within the scope of its liberal charge of icing substance and so long as pones of cake are placed on the conveyor and removed therefrom as the icing is applied.

A further object of this invention is to provide in the machine an endless woven metallic belt and a motor to actuate the movement of the belt and an airtight container for icing and compressed air to force the icing from the bottom of the container through a dispensing spray element for icing cake as conveyed thereunder.

A further object of this invention is to provide a pipe line to conduct the icing and a valve to control the quantity of icing desired and valves to control the air compression in the icing container.

These and other objects will hereinafter be more fully explained, reference being had to the accompanying drawings forming a part of the specification, and in which like characters will apply to like parts in the different views.

Referring to the drawings:

Fig. 1 is a side elevation of the machine, parts removed for convenience of illustration.

Fig. 2 is a plan view of Fig. 1.

Figs. 3 and 4 are enlarged front elevations of their respective ends of the machine, parts removed for convenience of illustration.

Fig. 5 is a fragmentary plan view of Fig. 3.

Fig. 6 is a fragmentary left end view of the machine.

Fig. 7 is an enlarged vertical sectional view taken on line 7—7 in Fig. 1 looking in direction of the arrows.

Fig. 8 represents one of the head rockable bolts to secure the head airtight.

Fig. 9 is a plan view of one corner of the casing assembly.

As a more concise description of the drawing for this invention, it will be seen that the machine comprises a casing consisting of sides, ends, and bottom walls 1, 2, and 3, respectively, and rollers 3' to carry the casing. Positioned in the casing adjacent one end wall is a container 4, the upper end of which is sealed airtight by a head 5, said head being rockably attached by hinge 6, and otherwise secured in an airtight closed position by hand wheels 7 screwed on rockable eye bolts 7' as shown in Figs. 1, 2, and 8 and being spaced therearound. The other end is closed by a concavo-convex bottom, said container to be charged with icing of a suitable flavor and discharged from the bottom through a pipe system later described.

As a means to discharge the icing from the container until all has been discharged, there is provided an intake pipe 8 axially secured to the head to communicate with the interior of the container, said pipe having a gage 9 to determine the pressure and a valve 10 to control the air, the supply of which is from a compressor not shown in the drawings but being connected to pipe 8 by a flexible pipe conductor 11 as shown in Fig. 1.

Positioned in the head of the container is a pop-off valve 12 to avoid excess pressure in the container, said pop-off to function as a safety medium and a signal in case of neglect or other causes.

It will be seen that the pipe system above referred to consists of a nipple 13 that connects the bottom to a horizontally disposed pipe 14, the latter being connected to a vertical pipe 15, the upper end of which is secured to a horizontal pipe 16 that extends along the upper extremity of the casing and being secured thereto, last said horizontally positioned pipe terminating near the longitudinal center of a metallic woven conveyor belt 17, at which point said pipe is connected to a U-shaped icing dispensing element 18, the leg A of which on its underside is closely apertured therealong to a distance approximately equal to the width of said conveyor belt for the purpose later described, the other leg B to function as a cushion chamber to insure uniformity of the spray as dispensed as said leg is sealed airtight by icing by its path to leg A, said conveyor belt is carried by rollers 19 and 20 that are journalled in bearings 21, said bearings being secured to brackets 22 that are carried by one frame member 23 of the casings support. It will be seen that roller 19 has a sprocket wheel 24 secured to its journal adjacent one end thereof and being turned through the medium of a chain belt 25 in mesh therewith, said belt extending downward to an electric motor 26 positioned in the casing, said motor having a conventional worm gear, not shown in the drawings but to function as a transmitter to reduce the R. P. M. of its gear shaft to which another sprocket wheel is secured and being in mesh with said chain belt to move the woven wire conveyor slowly beneath the said U-shaped icing dispenser, whereby cake or the like placed on the belt in juxta-position will receive a desired thickness of icing dispensed thereon continuously by supplying the belt with cake to be iced and then removed by operators of the machine. The icing with respect to quality for a desired thickness is controlled by a valve 27 placed in the pipe line adjacent the dispenser.

As a means to support the belt from sagging under its load, there is provided a plate 28, the edges of which are secured to the casing frame so that the belt will be carried slightly above the upper extremity of the casing, the ends of the plate terminating a spaced distance inward for their respective rollers on which the belt engages. Positioned at one side of the belt is a guide bar 29 adjustably carried by brackets 30 secured to the frame at the upper extremity of the casing, said bar having pins 31 to carry the same while the pins slidably engage through an upper portion of their respective brackets, and being secured by threaded stems 32 that are turned by their respective hand wheels 33 and against said bar pones of cake will slidably engage as conveyed by the belt while icing the same.

The components of the above described machine with respect to their form and mode of assembly may be modified within the scope of the appended claims.

Having thus described the invention what I claim as new and desire to secure by Letters Patent is:

1. In a machine for icing cake, or the like, of the class described comprising a casing of suitable length, depth and width and being rectangular in cross section, a cylindrical container for icing positioned in one end of the casing, the icing container having a concavo-convex bottom and a pipe-line connecting to the bottom at its diametrical center while the top of the container has an air-tight sealing means, said sealing means consisting of a hingedly connected head and clamping means positioned in spaced relation around the head, said clamping means being connected and adapted to rock outward from engagement with the head, while the clamping means consists of hand wheels threadedly engaging on rockable stems as tightening means for the head lying over an opening formed in the container head proper, a pressure air-line being connected to the container at its upper extremity whereby an empty portion of the icing container will function as an air compressor to eject the icing through its pipe line, and a valve to control a flow therethrough, a U-shaped element comprised of a pair of pipes of suitable lengths to cross the casing and spaced upward therefrom, the legs of which are sealed at the outer extremity, while their other ends are connected by a U-coupling and to the latter is connected the pipe line as supporting means therefor and a feed for icing into the U-shaped member, one leg of which is apertured while the other leg functions as a cushion chamber in close proximity to the apertured leg as a final sensitive means to guard against pulsative force that may occur, said casing having rollers journalled adjacent the ends and in close proximity to the upper extremity of the casing, said rollers having a wire woven belt positioned thereon for carrying pones of cake beneath the U-shaped element, the casing having a motor housed therein as actuating means for the wire woven belt.

2. In a machine for icing cake, or the like of the class described, a casing of suitable length, width and depth to function as a housing for a motor and a cylindrical container for icing, the container being exposed at its upper extremity and provided with a hingedly connected head to close its upper end, said head having a gasket surrounding the opening and on which the head will engage, eye bolts plurally applied in spaced relation around the head, said bolts having hand wheels to clamp the head air tight, and the said head and portion of the upper extremity of the container being outward from the casing as accessible means to charge and seal the container, the casing having rollers journalled in the side walls thereof to carry a wire woven belt flush with the upper extremity of the side walls of the casing, a spraying element crossing the belt near its longtudinal center and upwardly spaced therefrom, said spraying element comprised of a pair of legs spaced apart, one leg being apertured along its under side and a U-coupling for one of the corresponding ends while the other ends are removably plugged as cleansing means therefor, and pipe lines connecting the U-coupling of the legs with the container at its lower extremity, said pipe lines having valves to control icing pneumatically forced therethrough, the other end of the spraying element being carried by the casing while the first named ends are carried by the pipes, the motor having a chain belt to turn one of the rollers to move the wire woven belt slowly beneath the spraying element, and a pipe connecting the container with a source of compressed air.

DAVID H. DUFFY.

REFERENCES CITED

The following references are of record in the file of this patent:

UNITED STATES PATENTS

| Number | Name | Date |
| --- | --- | --- |
| 1,357,021 | Ayres et al. | Oct. 26, 1920 |
| 2,332,385 | Lauring | Oct. 19, 1943 |
| 2,320,529 | MacManus | June 1, 1943 |
| 1,973,778 | Price | Sept. 18, 1934 |
| 679,786 | See | Aug. 6, 1901 |
| 2,357,763 | Pratt | Sept. 5, 1944 |
| 1,851,538 | Day et al. | Mar. 29, 1932 |
| 2,260,686 | Segrin | Oct. 28, 1941 |